(No Model.)

E. E. HANF.
MANUFACTURE OF FINGER RINGS.

No. 324,553. Patented Aug. 18, 1885.

WITNESSES:
Otto Beyer
C. Sedgwick

INVENTOR:
E. E. Hanf
BY Munn & Co.
ATTORNEYS.

UNITED STATES PATENT OFFICE.

EDWIN E. HANF, OF WILMINGTON, DELAWARE.

MANUFACTURE OF FINGER-RINGS.

SPECIFICATION forming part of Letters Patent No. 324,553, dated August 18, 1885.

Application filed March 31, 1885. (No model.)

*To all whom it may concern:*

Be it known that I, EDWIN E. HANF, of Wilmington, county of New Castle, Delaware, have invented a new and Improved Process of Manufacturing Finger-Rings, of which the following is a full, clear, and exact description.

In the manufacture of plain gold finger-rings it is usual to bend a blank of metal into circular form and braze or solder the ends together by using an inferior metal as the medium, which leaves a thin line or band of a different color.

The object of my invention is to obviate this defect and produce rings without joints, or so united at the ends as not to be distinguished from rings stamped out from plates.

It consists in a method for manufacturing plain solid gold rings from a straight blank, as will be hereinafter described and claimed.

Reference is to be had to the accompanying drawings, forming part of this specification, in which similar letters of reference indicate corresponding parts in all the figures.

Figure 1:
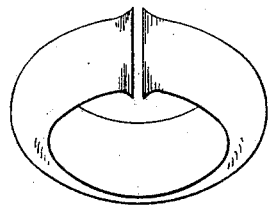
Figure 2:
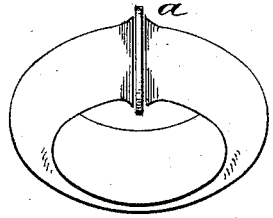
Figure 3:
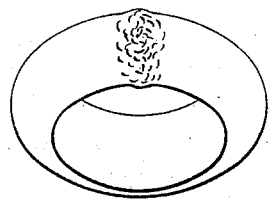
Figure 4:
Figure 5:
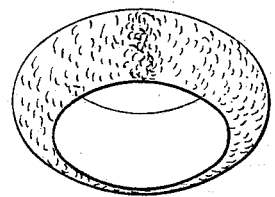
Figure 6:
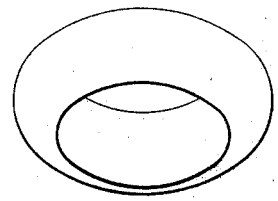

Figure 1 shows a ring-blank having its ends upset and bent preparatory to uniting the ends. Fig. 2 shows the same with a piece of the same metal inserted between the ends previous to uniting them. Fig. 3 shows a ring after the ends have been united. Fig. 4 shows the ring after rounding upon a mandrel. Fig. 5 shows the ring after being hammered on the mandrel, and Fig. 6 shows a finished ring.

In carrying out my invention the straight blank of half-round material is first hammered or upset on its ends to form a burr, and is then bent to a circular form, as shown in Fig. 1. For light rings a thin piece of gold is preferably placed between the ends, as shown at *a* in Fig. 2; but for heavy rings the two upset ends are brought closely together. The thickened ends and the inserted piece when used give metal enough to prevent that portion of the ring being left too thin by the melting operation. The two ends are then united by fusing or melting, a blow-pipe and other ordinary means being used for the purpose, which operation forms the continuous ring in the form as shown in Fig. 3.

Fig. 4 represents the ring as rounded upon a tapered mandrel. The next operation is hammering the ring to harden it and to increase the size in case it is too small when rounded up, which is done while the ring is on the tapering bar, leaving it as represented in Fig. 5. The final operation is turning off the surface to finish the ring to the form shown in Fig. 6.

The rings made in this manner are of the same material throughout, and are easily distinguished from those of usual manufacture from the fact that the line of different color made by the baser metal used at the joint is absent in these rings. This process saves the expense of stamping out the rings from sheets and avoids the objection to the usual brazing process. It also saves time and labor in making the rings larger after being finished and made up into stock, as rings made by this process can be put on a round tapered steel mandrel and beaten to the required size by the use of a hard wooden mallet in a short time and without injuring the polish; whereas rings made in the usual way can only be enlarged by cutting and fitting and soldering a piece between the open ends, and then refinishing the joint, as such rings will not bear beating or hammering without bursting open at the joint.

Having thus described my invention, I claim as new and desire to secure by Letters Patent—

The method herein described for making solid rings from a straight blank of metal, which consists in upsetting the ends of the blank, bending the blank into circular form, thereby bringing the upset ends together, uniting the said ends by fusion, rounding up the ring thus formed, condensing the metal of the ring by hammering, and incidentally thereto bringing the ring up to size, and then turning off the surface of the ring, substantially as set forth.

EDWIN E. HANF.

Witnesses:
WILLIAM H. ROBINSON,
JAMES KIRKLEY.